US005175485A

United States Patent [19]
Joo

[11] Patent Number: 5,175,485
[45] Date of Patent: Dec. 29, 1992

[54] APPARATUS FOR CONTROLLING CHARGING OF A STORAGE BATTERY

[75] Inventor: Yeong J. Joo, Kwangmyung, Rep. of Korea

[73] Assignee: Gold Star Co., Ltd., Seoul, Rep. of Korea

[21] Appl. No.: 762,108

[22] Filed: Sep. 19, 1991

[30] Foreign Application Priority Data

Sep. 19, 1990 [KR] Rep. of Korea .......... 14845/1990[U]

[51] Int. Cl.$^5$ .............................................. H02J 7/00
[52] U.S. Cl. ....................................... 320/32; 320/20; 320/39
[58] Field of Search ........................ 320/20, 21, 32, 39

[56] References Cited

U.S. PATENT DOCUMENTS

| | | | |
|---|---|---|---|
| 4,225,815 | 9/1980 | Lind et al. ......................... | 320/20 X |
| 4,418,310 | 11/1983 | Bollinger ............................... | 320/39 |
| 4,629,965 | 12/1986 | Fallon et al. ..................... | 320/20 X |
| 4,952,861 | 8/1990 | Horn ................................ | 320/32 X |
| 4,959,604 | 9/1990 | Cuesta ............................... | 320/32 X |

Primary Examiner—R. J. Hickey
Attorney, Agent, or Firm—Finnegan, Henderson, Farabow, Garrett and Dunner

[57] ABSTRACT

An apparatus for controlling charging of a storage battery that initially charges the storage battery in a constant current charging mode and then in a constant voltage charging mode when the charging voltage across the storage battery reaches a desired value. The present apparatus includes power supply means for operating initially in the constant current charging mode and supplying power to the storage battery, charged voltage state detecting means for switching over the operation of the power supply means from the constant current charging mode to the constant voltage charging mode when the charged voltage reaches the desired value, switching means for receiving the voltage being applied to the storage battery when the power supply means operates in the constant voltage charging mode and for dividing the received voltage at different predetermined rates to output the voltage-divided signals, and current variation detecting means for detecting a variation of the current being applied to the storage battery in response to an output signal from the switching means to output a power-off signal to the power supply means.

10 Claims, 4 Drawing Sheets

APPARATUS FOR CONTROLLING CHARGING OF A STORAGE BATTERY

BACKGROUND OF THE INVENTION

1. Field of the Invention

The present invention relates to an apparatus for controlling charging of a storage battery.

2. Description of the Prior Art

Conventionally, an apparatus for controlling charging of a storage battery has been provided for supplying power from a power supply to the storage battery to perform rapid charging with a constant current and then stopping the current to the storage battery at completion.

FIG. 1 shows a circuit diagram of a conventional apparatus for controlling the charging of the storage battery. The illustrated apparatus comprises a power supply 1 for supplying a predetermined current, a storage battery 2 for receiving the current from the power supply 1 through a diode D1, a charged voltage state detector 3 including a zener diode ZD1, resistors R1–R4, and a capacitor C1 for checking the charging state of the storage battery 2 to output first and second voltage signals V1 and V2 in accordance with the result, a peak value detector 4 including resistors R5 and R6, an operational amplifier OP1, a diode D2, and a capacitor C4 for receiving the second voltage signal V2 from the charged voltage state detector 3 to detect a peak value of the second voltage signal V2, a peak value holder 5 including resistors R7–R10, capacitors C2 and C3, a transistor Q1, and a diode D3 for constantly holding an output signal V3 from the peak value detector 4, and a comparator 6 including an operational amplifier OP2 and a capacitor C5 for receiving the first voltage signal V1 from the charged voltage state detector 3 and the output signal V3 from the peak value detector 4 and comparing the received signals V1 and V3 to produce an output signal V4 as a power-on signal or a power-off signal to the power supply 1 in accordance with the compared result.

The operation of the conventional apparatus with the above mentioned construction will now be described.

First, upon being turned on, the power supply 1 supplies a constant current to the storage battery 2 through diode D1, so that the storage battery 2 is rapidly charged with the constant current. During the charging of the storage battery 2, a small current flows through the charged voltage state detector 3. Namely, the small current passes through resistors R1, R2, and R3 in that order and then flows through capacitor C1 and resistor R4. As a result, the first and second voltage signals V1 and V2 are output from the charged voltage state detector 3.

Note that during the charging of the storage battery 2, the first voltage signal V1 has a value higher than that of the second voltage signal V2.

The first voltage signal V1 is applied to the non-inverting input terminal (+) of the operational amplifier OP2 in the comparator 6 and the second voltage signal V2 is applied to the non-inverting input terminal (+) of the operational amplifier OP1 in the peak value detector 4 through resistor R5.

The peak value is always detected at capacitor C4 in the peak value detector 4 and the detected peak value is then applied to the inverting input terminal (−) of the operational amplifier OP2 in the comparator 6. For this reason, during the charging of the storage battery 2, the comparator 6 produces a "high" state output signal V4. This high output signal V4 is applied to the power supply 1 so that the power supply 1 remains on for the continuous charging of the storage battery 2.

In the peak value holder 5, transistor Q1 is turned on in response to an external input signal V5 during the charging of the storage battery 2, thereby causing the voltage across capacitor C4 in the peak value detector 4 to be discharged. As a result, the peak value holder 5 holds the output signal from the peak value detector 4 constant.

If the charging of the storage battery 2 is completed at instant t0, for example, in FIG. 2A, a large amount of current flows through resistor R1 in the charged voltage state detector 3. Also, if the amount of the flowing current exceeds a predetermined value, the zener diode ZD1 becomes shorted. For this reason, the current flowing through resistor R1 flows through the zener diode ZD1, not through resistors R2 and R3, and then flows through capacitor C1 and resistor R4. At this time, the second voltage signal V2 has a value higher than that of the first voltage signal V1.

As a result, the output signal V3 from the peak value detector 4 is higher than the first voltage signal V1 from the charged voltage state detector 3 so that the comparator 6 outputs a "low" state output signal V4. This low output signal V4 is applied to the power supply 1 to turn off the power supply 1.

With reference to FIG. 2A, a more detailed description of the above operation of the conventional apparatus will be presented.

During the time interval 0-t0 in which the charging of the storage battery 2 is advanced, the first voltage signal V1 from the charged voltage state detector 3 is higher than the output signal V3 from the peak value detector 4. Thus, comparator 6 outputs a high signal V4, thereby allowing the power supply 1 to remain turned on. The voltage across the storage battery 2 is maximum at the instant t0 and, at instant t1 after the lapse of a predetermined period of time T, the first voltage signal V1 from the charged voltage state detector 3 is lower than the output signal V3 from the peak value detector 4. Thus, comparator 6 outputs a low signal V4.

The conventional apparatus has the following disadvantages.

First, as shown in FIG. 2b, since the charging operation begins at the instant t0 in which the voltage charged into the storage battery 2 is maximum and is completed at the instant t1 in which the charged voltage is decreased by voltage variation ΔV to a desired value of the charged voltage, an overcurrent is needed. The overcurrent is supplied to the storage battery 2 during a detection period of time T during the variation ΔV, thereby causing the life of the storage battery 2 to be shortened.

Second, since the maximum value of the charging current necessary for the rapid charging is decreased for the protection of the storage battery 2 from the overcurrent, the charging period is lengthened.

Third, a costly timer must be added separately to protect against an unexpected variation of the voltage of the storage battery 2 or a malfunction of a temperature detecting circuit.

SUMMARY OF THE INVENTION

The present invention has been made in view of the above problems, and an object of the present invention is to provide an apparatus for controlling the charging of a storage battery which charges the storage battery rapidly in a constant current charging mode, switches over automatically from the constant current charging mode to a constant voltage charging mode before the voltage charged into the storage battery reaches the maximum value, and completes charging of the storage battery in the constant voltage charging mode.

A further object is to prevent the shortening of the storage battery life due to an overcurrent and to reduce the charging period of the storage battery.

In accordance with the present invention, the objects can be accomplished by an apparatus for controlling charging of a storage battery including power supply means for operating initially in a constant current charging mode and then operating in a constant voltage charging mode in response to a charging mode switch-over signal, the storage battery being charged with a predetermined voltage by a constant current and a constant voltage from the power supply means, wherein the improvement comprises the following elements:

charged voltage state detecting means for checking a charging state of the storage battery to output the charging mode switch-over signal for switching from the constant current charging mode to the constant voltage charging mode to the power supply means if the charged voltage reaches a predetermined constant value;

switching means for switching to an input stage of the storage battery in response to an output signal from the charged voltage state detecting means to input the voltage being input to the storage battery and dividing the input voltage at different predetermined rates to output a plurality of signals;

current variation detecting means for inputting one output signal from the switching means as a reference signal and designating as a charging completion point of time the time when the input signal is varied to an increase direction different from the initial state to output a desired level of signal as a power-off signal for completion of the charging of the storage battery to the power supply means;

timing means for determining a predetermined period of time in accordance with external control signals and outputting a desired level of signal as another power-off signal for completion of the charging of the storage battery to the power supply means after the lapse of the predetermined period of time in response to the output signal from the charged voltage state detecting means; and resetting means for resetting the current variation detecting means to the initial state in response to another output signal from the switching means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

First, a construction of an apparatus for controlling the charging of a storage battery in accordance with the present invention will be described with reference to FIGS. 3 and 5.

Figure 1:
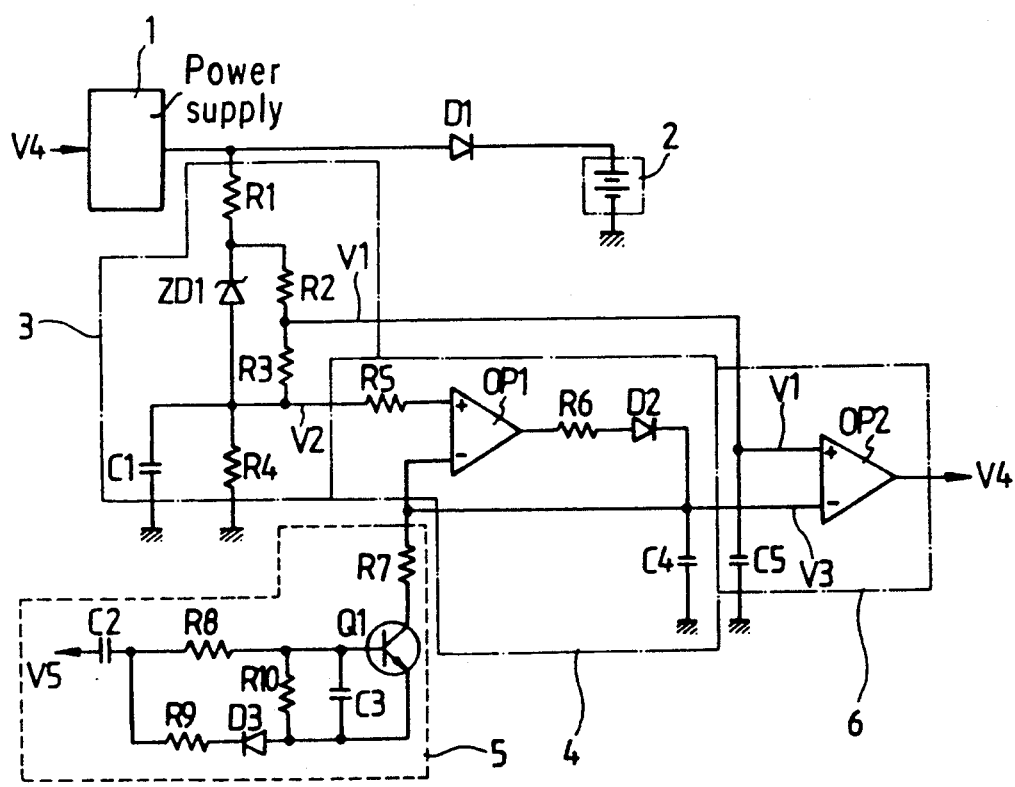
FIG. 1 is a circuit diagram of a conventional apparatus for controlling the charging of a storage battery.
Figure 2A:
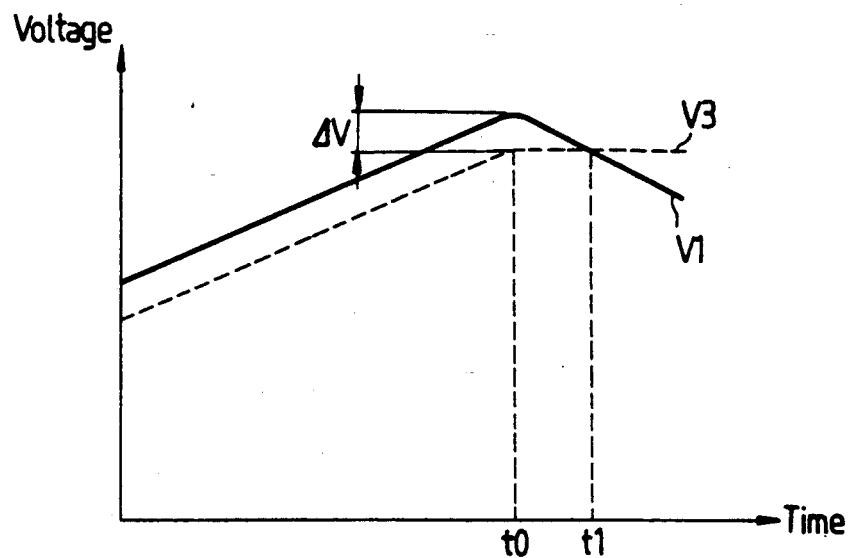
FIGS. 2A and 2B show operating characteristics of the conventional apparatus in FIG. 1.
Figure 2B:
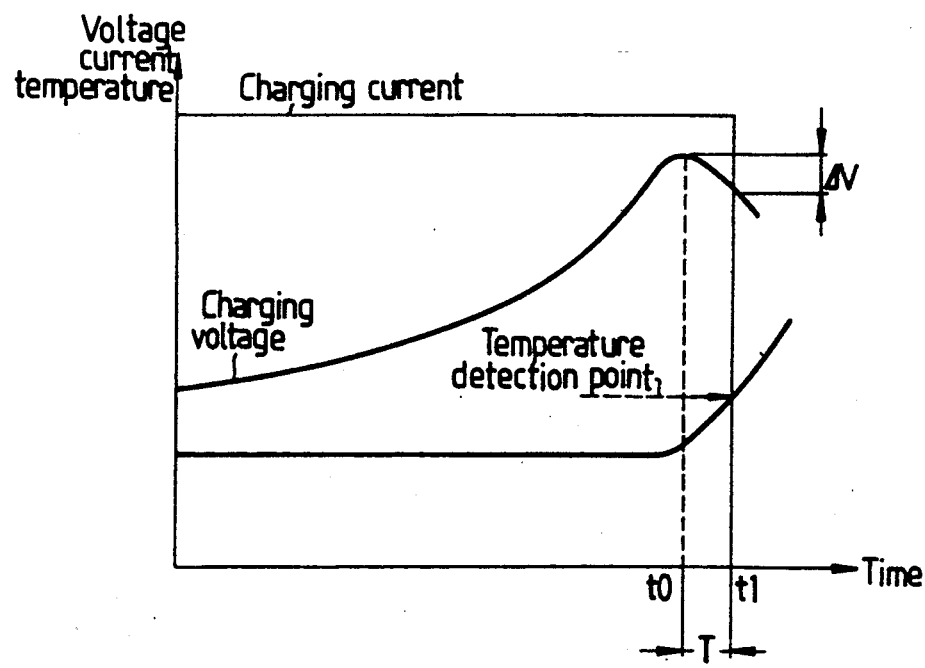
Figure 3:
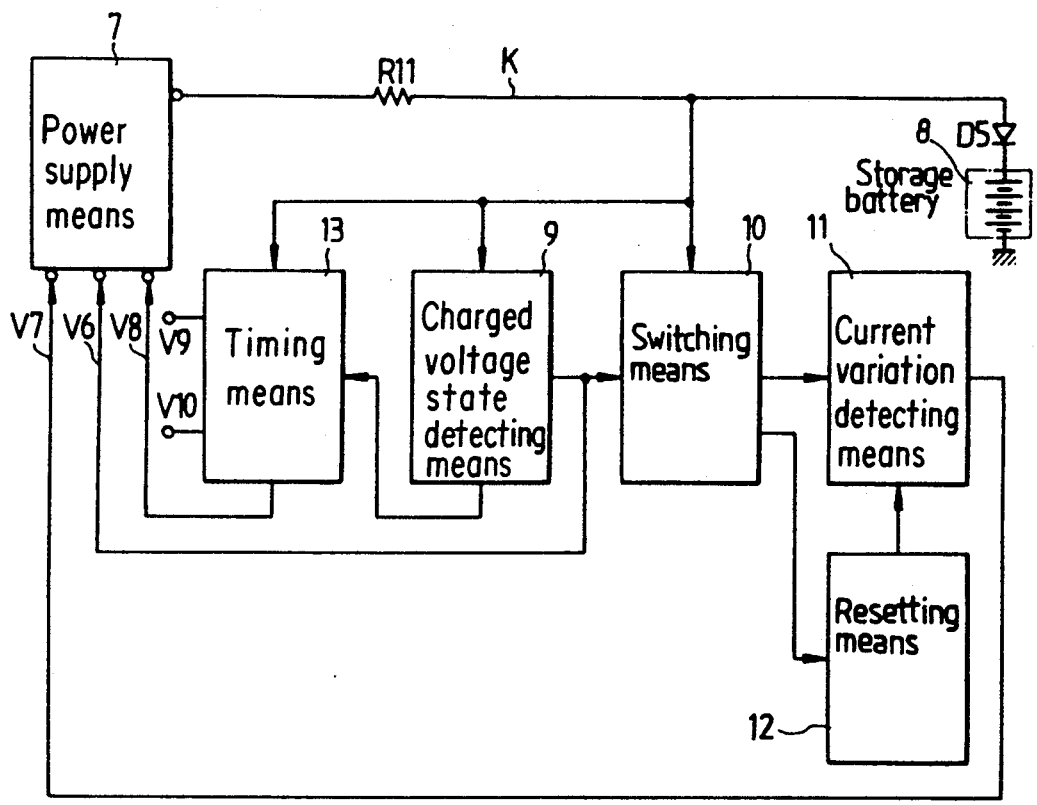
FIG. 3 is a block diagram of an apparatus for controlling the charging of the storage battery in accordance with the present invention.

FIG. 3 shows a block diagram of an apparatus for controlling the charging of a storage battery in accordance with the present invention. As shown in this drawing, the apparatus of the present invention includes power supply means 7 which operates in a constant current charging mode and a constant voltage charging mode. The power supply means 7 operates initially in the constant current charging mode. A storage battery 8 is connected to an output stage of the power supply means 7 via a load resistor R11 and a reverse current preventing diode D5. The storage battery 8 is charged with a predetermined voltage by a constant current and a constant voltage from the power supply means 7.

The embodiment includes charged voltage state detecting means 9, connected between the output stage of the power supply means 7 and an input stage of the storage battery 8, which checks for the charging state of the storage battery 8 to output a desired signal V6 for switching-over from the constant current charging mode to the constant voltage charging mode to the power supply means 7. The switch over occurs if the charged voltage reaches a predetermined constant value (preferably about 80–90% of a desired value of the charged voltage). Switching means 10 is connected to an output stage of the charged voltage state detecting means 9. Switching means 10 switches to the input stage of the storage battery 8 in response to an output signal from the charged voltage state detecting means 9 to input the voltage being applied to the storage battery 8 and dividing the applied voltage at different predetermined rates to output two signals.

The embodiment further includes current variation detecting means 11 for receiving one output signal from the switching means 10. The detecting means 11 calculates a charging completion point of time, such time being when the received signal begins to increase to output a desired level of a power-off signal V7 to the power supply means 7. Resetting means 12 resets the current variation detecting means 11 to the initial state immediately in response to the other output signal from the switching means 10.

The embodiment further includes timing means 13 for determining a predetermined period of time in accordance with external control signals V9 and V10. The timing means 13 outputs a desired power-off signal V8 to the power supply means 7 after the lapse of the predetermined period of time in response to the output signal from the charged voltage state detecting means 9.

Figure 5:
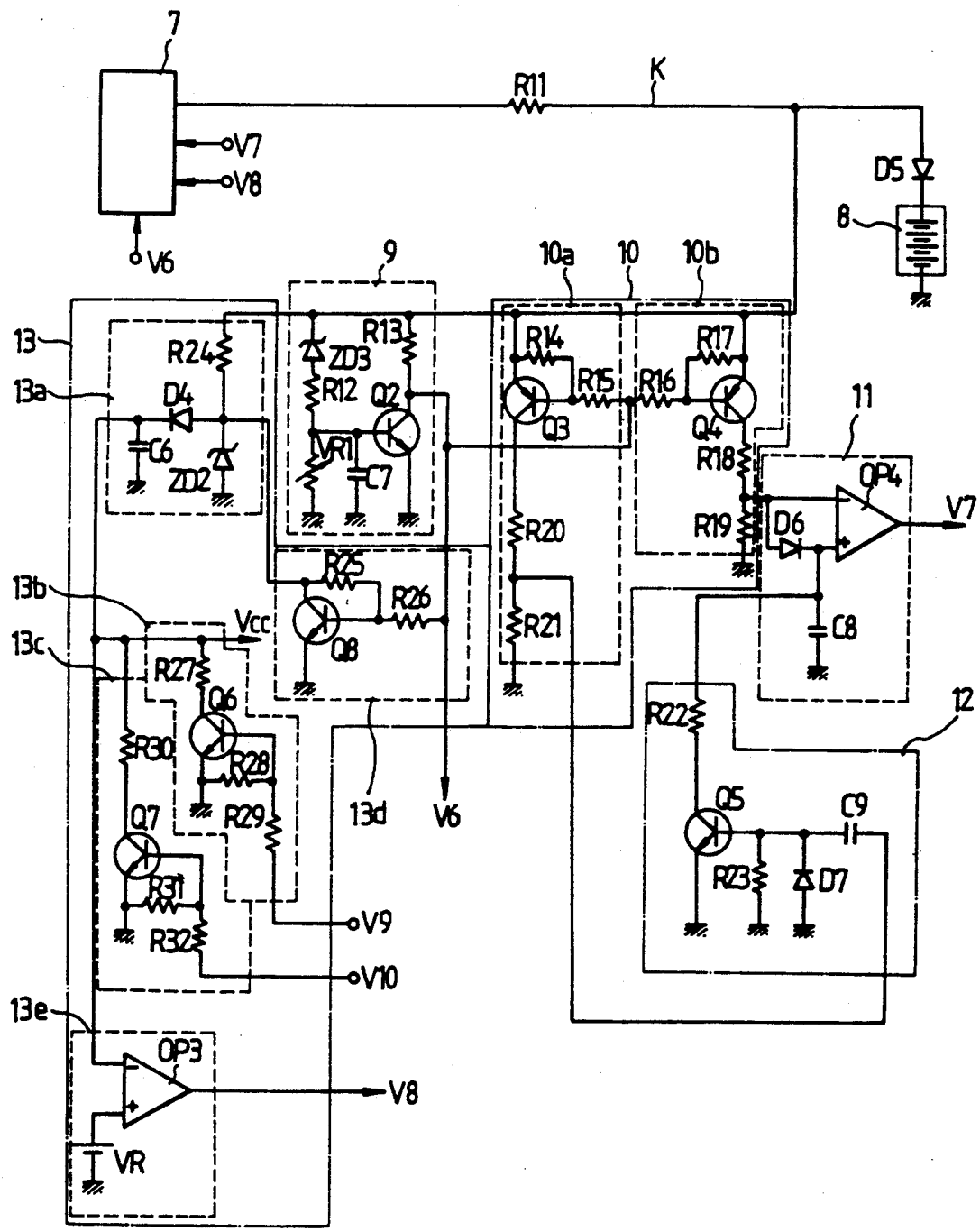
FIG. 5 is a detailed circuit diagram of the apparatus in FIG. 3 in accordance with an embodiment of the present invention.

FIG. 5 shows a detailed circuit diagram of the apparatus in FIG. 3 in accordance with an embodiment of the present invention. As shown in this drawing, the charged voltage state detecting means 9 is provided with a zener diode ZD3 which conducts when the voltage charged into the storage battery 8 reaches the predetermined constant value (preferably about 80–90% of the desired value of the charged voltage), to detect the charged voltage. The detecting means 9 includes a transistor Q2 which is turned on simultaneously with the turning-on of the zener diode ZD3. The transistor Q2 outputs the charging mode switch-over signal V6 of low level to the power supply means 7 so that the operation of the power supply means 7 can be switched over from the initial constant current charging mode to the constant voltage charging mode. Also, the charged voltage state detecting means 9 includes resistors R12 and R13, a variable resistor VR1 and a capacitor C7. The variable resistor VR1 functions to set a voltage for the turning-on of the zener diode ZD3.

The switching means 10 is provided with a first switching circuit 10a and a second switching circuit 10b. The first switching circuit 10a is for switching to the input stage of the storage battery 8 in response to the output signal from the charged voltage state detecting means 9 to input the voltage being applied to the storage battery 8 and for dividing the applied voltage at a predetermined rate to output the voltage-divided signal. The second switching circuit 10b is for switching to the input stage of the storage battery 8 in response to the output signal from the charged voltage state detecting means 9 to input the voltage being applied to the storage battery 8 and for dividing the applied voltage at a predetermined rate, this rate being different from that in the first switching circuit 10a, to output the voltage-divided signal. The first switching circuit 10a includes a transistor Q3 and resistors R14, R15, R20, and R21, and the second switching circuit 10b includes a transistor Q4 and resistors R16–R19.

The current variation detecting means 11 includes a capacitor C8 and an operational amplifier OP4. The capacitor C8 receives an output signal from the second switching circuit 10b through a diode D6 and is charged by the received output signal when the power supply means 7 operates in the constant voltage charging mode. The operational amplifier OP4 compares the voltage across capacitor C8 with an output signal from the second switching circuit 10b which is applied with a delay. Namely, capacitor C8 and diode D6 hold a comparative reference voltage in the constant voltage charging of the storage battery 8 and the operational amplifier OP4 functions to compare the compare reference voltage with an increment of a charging current of the storage battery 8.

The resetting means 12 is provided with a capacitor C9 and transistor Q5. The capacitor C9 receives an output signal from the first switching circuit 10a and is charged by the received signal. The transistor Q5 is turned on while capacitor C9 is being charged with the received signal to discharge capacitor C8 as a source of the comparative reference voltage in the current variation detecting means 11, so as to initialize the current variation detecting means 11. Also, the resetting means 12 includes resistors R22 and R23 and a diode D7. Resistor R22, transistor Q5, and diode D7 form a discharging path for capacitor C8 of the current variation detecting means 11. Capacitor C9 and resistor R23 determine the turn-on period for transistor Q5.

The timing means 13 is provided with a charging circuit 13a for receiving and being charged with the voltage being applied to the storage battery 8. First and second discharging circuits 13b and 13c are provided for discharging the voltage charged on the charging circuit 13a having different discharging periods in accordance with external control signals V9 and V10 which are selected by the user. A timing start circuit 13d is provided for operating in response to a desired output signal from the charged voltage state detecting means 9 such that the voltage charged on the charging circuit 13a can be discharged. A comparing circuit 13e is provided for receiving the voltage charged on the charging circuit 13a and a predetermined reference voltage, and outputting a high level signal as the power-off signal to the power supply means 7 when the voltage charged on the charging circuit 13a becomes discharged.

The charging circuit 13a includes a resistor R24, a diode D4, a zener diode ZD2, and a capacitor C6. The first discharging circuit 13b includes resistors R27–R29 and a transistor Q6. The second discharging circuit 13c includes resistors R30–R32 and a transistor Q7. The timing start circuit 13d includes a transistor Q8 and resistors R25 and R26. The comparing circuit 13e includes a reference voltage source $V_R$ and an operational amplifier OP3.

The operational amplifier OP3 includes an inverting input terminal (−) for inputting the voltage charged on the charging circuit 13a and a non-inverting input terminal (+) for inputting the reference voltage from the reference voltage source $V_R$. The transistors Q6 and Q7 operate as discharging paths from the capacitor C6. The operational amplifier OP3 operates to output the power-off signal V8 to the power supply means 7 when the voltage charged on capacitor C6 is discharged below a predetermined level. Also, capacitor C6 and resistors R27 and R30 determine a discharging time constant.

The external control signals V9 and V10 are high level signals applied to the first and second discharging circuits 13b and 13c, respectively, when the user operates an external timer switch in order to set a charging period of time suitable for the capacity of a particular storage battery 8.

Now, the operation of the apparatus with the above-mentioned construction in accordance with the present invention will be described in detail with reference to FIGS. 3 and 4.

First, in the initial constant current charging of the storage battery 8, the voltage at point "K" is increased as the storage battery 8 is charged. When the voltage at point "K" reaches a predetermined level of voltage $V_D$ of about 80–90% of the capacity of the storage battery 8, the charged voltage state detecting means 9 outputs the charging mode switch-over signal of a desired level to the power supply means 7. As a result, the operation of the power supply means 7 is switched over from the constant current charging mode to the constant voltage charging mode, thereby allowing the storage battery 8 to be charged by the constant voltage.

It is noted that the amount of current flowing through the point "K" is reduced in the constant voltage charging of the storage battery 8 since the internal resistance of the storage battery 8 increases as the storage battery 8 is charged.

Next, a detection signal from the charged voltage state detecting means 9 is applied to the switching means 10. Upon receiving the detection signal from the charged voltage state detecting means 9, the switching means 10 switches the voltage applied to the current variation detecting means 11 to the voltage at the point "K," initiates the operation of the timing means 13, and operates the resetting means 12 to reset the current variation detecting means 11 to the initial state, thereby allowing stable operation of the current variation detecting means 11.

At this time, the current variation detecting means 11 detects that the amount of the current at the point "K"

stops dropping and begins to increase. That is, if the charging of the storage battery 8 is completed in the constant voltage charging mode and the storage battery 8 then begins to be overcharged, the gas pressure within the storage battery 8 is increased and thus the temperature within the storage battery 8 is increased. As a result, the internal resistance of the storage battery 8 is reduced, thereby causing the amount of current at point "K" to increase.

The current variation detecting means 11 detects the time when the amount of current at point "K" is increased and outputs the power-off signal V7 to the power supply means 7 for the completion of the charging of the storage battery 8 in accordance with the detected result. Upon receiving the power-off signal V7 from the current variation detecting means 11, the power supply means 7 shuts off the constant voltage power being supplied to the storage battery 8 to stop the charging of the storage battery 8.

Figure 4:
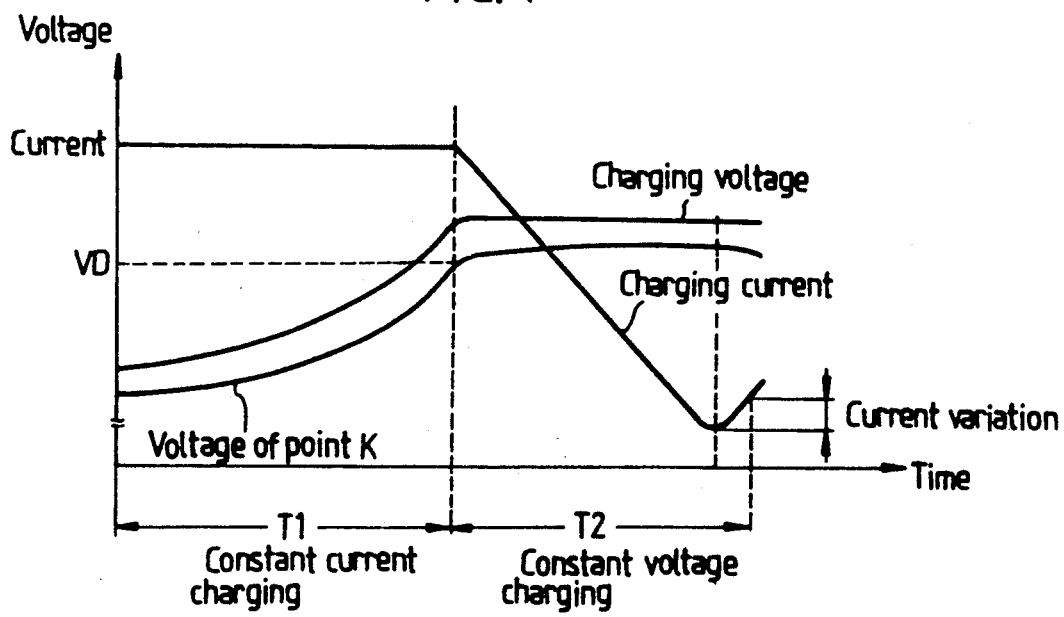
FIG. 4 shows operating characteristics of the apparatus in FIG. 3.

The relationship between timing period T of the timing means 13 and the charging period of time (T1+T2 as indicated in FIG. 4) is defined by equation (1) as follows:

$$T > T1 + T2 \quad (1)$$

For this reason, in the case where the current variation detecting means 11 fails to detect the variation of the current according to the completion of charging, the timing means 13 outputs the power-off signal V7 to the power supply means 7 for the completion of the charging of the storage battery 8.

Next, the operation of the apparatus in accordance with the present invention will be described in more detail with reference to FIGS. 4 and 5.

First, in the constant current charging mode, the constant current from the power supply means 7 flows through the resistor R11 and the reverse current preventing diode D5 to the storage battery 8, thereby allowing the storage battery 8 to begin charging with the constant current.

The voltage being charged into the storage battery 8, i.e., the voltage at the point "K," is also applied to the timing means 13, the charged voltage state detecting means 9 and the switching means 10. The voltage at point "K" is then applied to capacitor C6 through resistor R24 and diode D4 in the charging circuit 13a of the timing means 13. Thus, capacitor C6 is charged with the applied voltage. Zener diode ZD2 operates to charge the capacitor C6 with a constant voltage.

The voltage charged in capacitor C6, when transistor Q6 in the first discharging circuit 13b or transistor Q7 in the second discharging circuit 13c is turned on, is discharged through resistor R27 or resistor R30, respectively. Each of transistors Q6 and Q7 is turned on when its base is applied with a high level signal. As a result, the discharging time constant of capacitor C6 is determined according to the external high control signals V9 and V10 applied to the bases of the transistors Q6 and Q7, respectively.

For instance, when the user operates the external timer switch (not shown) to apply the external high control signal V9 to the first discharging circuit 13b, transistor Q6 is turned on so that the voltage charged on capacitor C6 is discharged through resistor R27, the collector and the emitter of transistor Q6. As a result, in the operational amplifier OP3 of the comparing circuit 13e, the voltage level at the inverting input terminal (−) is lower than reference voltage level at the non-inverting input terminal (+). At this time, the output signal from the comparing circuit 13e switches from the low level to the high level. This low level signal is applied to the power supply means 7 as the power-off signal V8 for the completion of the charging of the storage battery 8. Hence, the power supply means 7 shuts off the power being supplied to the storage battery 8 to complete the charging of the storage battery 8.

Since the discharging time constant T, according to capacitor C6 and resistor R27, is defined by the equation (1) as indicated in FIG. 4, the charging of the storage battery 8 can be completed even though the current variation detecting means 11 fails to detect the charging completion point of time.

The voltage at point "K" is increased as the storage battery 8 is charged as mentioned above. When the voltage at point "K" is increased to a predetermined level of voltage $V_D$ of about 80–90% of the capacity of the storage battery 8, the zener diode ZD3 is turned on and thus, transistor Q2 is turned on in the charged voltage state detecting means 9. As a result, the collector potential of transistor Q2 is switched over from the high level to the low level. This low level signal is applied to the power supply means 7 as the charging mode switching-over signal V6. At this time, the operation of the power supply means 7 is switched over from the constant current charging mode to the constant voltage charging mode, thereby allowing the storage battery 8 to be charged with the constant voltage.

If the collector potential of the transistor Q2 is switched to the low level, transistor Q3 in the first switching circuit 10a of the switching means 10 is turned on so that the voltage at point "K" is divided through the resistors R20 and R21 in the first switching circuit 10a. The divided voltage is applied to resistor R23 and to the base of transistor Q5 through capacitor C9 in the resetting means 12.

Hence, capacitor C9 is charged with the divided voltage, and during the charging of capacitor C9, transistor Q5 is turned on, so that the voltage charged on capacitor C8 in the current variation detecting means 11 is discharged through resistor R22 and the collector-emitter of transistor Q5 in the resetting means 12.

Transistor Q5 is turned off when the charging of capacitor C9 is completed. As a result, the current variation detecting means 11 is reset to the initial state at the time when the charging mode is switched over from the constant current charging mode to the constant voltage charging mode, so that a stabilized current variation detecting operation can be performed.

On the other hand, if transistor Q4 in the second switching circuit 10b of the switching means 10 is turned on, the voltage at point "K" is divided through resistors R18 and R19. The divided voltage is applied to the inverting input terminal (−) of the operational amplifier OP4 and, at the same time, charges capacitor C8 through diode D6. This voltage across capacitor C8 is applied to the non-inverting input terminal (+) of the operational amplifier OP4 as a reference voltage.

If the collector potential of transistor Q2 in the charged voltage state detecting means 9 is switched to the low level, transistor Q8 in the timing start circuit 13d of the timing means 13 is turned on, thereby causing the zener diode ZD2 and diode D4 in the charging circuit 13a to be turned off.

As a result, the voltage charged on capacitor C6 in the charging circuit 13a begins to be discharged through resistor R27 in the first discharging circuit 13b or resistor R30 in the second discharging circuit 13c, thereby allowing the timing means 13 to operate.

As the constant voltage charging continues, as mentioned above, the amount of current flowing to the storage battery 8 is reduced gradually. Then, when the charging of the storage battery 8 is completed and the storage battery 8 begins to be overcharged, the amount of current flowing to the storage battery 8 is again increased because of the presence of a reverse current. For this reason, the voltage at point "K"0 is lower, and thus, the voltage divided through resistors R18 and R19 is also lower.

Since the voltage divided through resistors R18 and R19 is lower, as mentioned above, the voltage level at the inverting input terminal (−) of the operational amplifier OP4 in the current variation detecting means 11 is lower than that of the voltage charged on capacitor C8 being applied to the non-inverting input terminal (+) of the operational amplifier OP4. As a result, the output signal from the operational amplifier OP4 is switched over from the low level to the high level. This high level signal is applied to the power supply means 7 as the power-off signal V7.

As hereinbefore described, the apparatus in accordance with the present invention can provide advantages as follows:

First, if the storage battery is rapidly charged with a constant current and then the charged voltage reaches a predetermined voltage level, the storage battery is charged with the constant voltage, thereby allowing the amount of current being overcharged to be reduced at the end of charging. Therefore, life of the storage battery can be lengthened, and the charging period can be shortened. The amount of charging current in the constant current charging can be increased by several times or more over the prior art.

Second, the timing function can be performed without a costly timer, which has been employed and separately added in conventional devices, in order to prepare for variations of the charging voltage of the storage battery or malfunctions of a temperature detecting circuit.

Although the preferred embodiments of the present invention have been disclosed for illustrative purpose, those skilled in the art would appreciate that various modifications, additions and substitutions are possible, without departing from the scope and spirit of the invention as disclosed in the accompanying claims.

What is claimed is:

1. An apparatus for controlling charging of a storage battery comprising:
   power supply means for operating initially in a constant current charging mode and then operating in a constant voltage charging mode in response to a charging mode switch-over signal, said storage battery being charged sequentially with a constant current and then a constant voltage from said power supply means;
   charged voltage state detecting means for checking a charging state of said storage battery to output said charging mode switch-over signal to said power supply means, for switching-over from the constant current charging mode to the constant voltage charging mode, when the charged voltage reaches a predetermined constant value;
   switching means for receiving, in response to said output signal from said charged voltage state detecting means, the voltage being applied to said storage battery and dividing the received voltage at different predetermined rates to output a plurality of signals; and
   current variation detecting means for receiving one output signal from said switching means as a reference signal and designating the time when the output signal begins to increase as a charging completion point of time to output a desired signal level of a power-off signal to said power supply means indicating completion of the charging of said storage battery.

2. An apparatus for controlling charging of a storage battery according to claim 1, further comprising timing means for determining a predetermined period of time in accordance with external control signals and outputting a desired signal level as a second power-off signal to said power supply means indicating completion of the charging of said storage battery after a lapse of the predetermined period of time in response to the output signal from said charged voltage state detecting means.

3. An apparatus for controlling charging of a storage battery according to claim 1, further comprising resetting means for resetting said current variation detecting means to an initial state in response to another output signal from said switching means.

4. An apparatus for controlling charging of a storage battery according to claim 1, wherein said charged voltage state detecting means includes:
   a Zener diode connected to said input stage of said storage battery, said Zener diode being turned on when the voltage charged into said storage battery reaches the predetermined constant value; and
   first switch means, being turned on when said Zener diode is turned on, for outputting a desired signal level of said charging mode switch-over signal to said power supply means for switching-over from the constant current charging mode to the constant voltage charging mode.

5. An apparatus for controlling charging of a storage battery according to claim 1, wherein said switching means includes:
   a plurality of switch means, each for receiving the voltage being applied to said storage battery in response to the output signal from the charged voltage state detecting means; and
   a plurality of voltage-dividing means, each for dividing the voltage received through each of said plurality of switch means, respectively, at said different predetermined rates to output different voltage-divided signals.

6. An apparatus for controlling charging of a storage battery according to claim 1, wherein said current variation detecting means includes:
   first charging means for receiving said one output signal from said switching means, said first charging means being charged with the received output signal; and
   first comparing means for comparing the voltage charged in said first charging means designated as a reference signal with one of said plurality of signals from said switching means designated as a comparing signal, said comparing signal being received subsequent to said reference signal to output said power-off signal to said power supply means when the charging of said storage battery is completed indicated by an increase in said current being applied to said storage battery.

7. An apparatus for controlling charging of a storage battery according to claim 1, wherein said predetermined constant value in said charged voltage state detecting means is below about 90% of a desired value of the voltage being charged into said storage battery.

8. An apparatus for controlling charging of a storage battery according to claim 2, wherein the relationship between a timing period of time of said timing means, a charging period of time in the constant current mode, and a charging period of time in the constant voltage mode is defined by the following:

$$T > T1 + T2$$

where,
  T is the timing period of time,
  T1 is the charging period of time in the constant current charging mode of said storage battery, and
  T2 is the charging period of time in the constant voltage charging mode of said storage battery.

9. An apparatus for controlling charging of a storage battery according to claim 2, wherein said timing means includes:
  second charging means for receiving the voltage being applied to said storage battery, said first charging means being charged with the received voltage;
  timing start means for operating in response to the output signal from said charged voltage state detecting means such that the voltage charged on said second charging means can be discharged;
  a plurality of discharging means having different discharging time constants, each of said plurality of discharging means being selected in accordance with said external control signals to provide different discharging paths to the voltage charged on said second charging means; and
  second comparing means for comparing the voltage charged on said second charging means with a predetermined reference voltage to output said second power-off signal to said power supply means for completion of the charging of said storage battery when the voltage charged on said second charging means is discharged.

10. An apparatus for controlling charging of a storage battery according to claim 3, wherein said resetting means includes:
  third charging means for receiving said another output signal from said switching means, said third charging means being charged with the received output signal; and
  second switch means for being turned on while said third charging means is charged with the received output signal, to provide a discharging path to the voltage charged on said first charging means to initialize said current variation detecting means.

* * * * *